US011560036B2

(12) United States Patent
Williamson et al.

(10) Patent No.: US 11,560,036 B2
(45) Date of Patent: *Jan. 24, 2023

(54) FRAME FITTING ARRANGEMENT FOR VEHICLE AIR CONDITIONER

(71) Applicant: Dometic Sweden AB, Solna (SE)

(72) Inventors: Jarrod Williamson, Olinda (AU); Louis Liu, Zhuhai (CN)

(73) Assignee: Dometic Sweden AB, Solna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,723

(22) Filed: Jun. 9, 2021

(65) Prior Publication Data

US 2021/0354526 A1 Nov. 18, 2021

Related U.S. Application Data

(62) Division of application No. 16/078,478, filed as application No. PCT/AU2017/050153 on Feb. 22, 2017, now Pat. No. 11,034,208.

(30) Foreign Application Priority Data

Feb. 22, 2016 (AU) ................................ 2016900617

(51) Int. Cl.
*B60H 1/00* (2006.01)
*F24F 1/027* (2019.01)
*E04D 13/03* (2006.01)

(52) U.S. Cl.
CPC ..... *B60H 1/00535* (2013.01); *B60H 1/00364* (2013.01); *B60H 1/00542* (2013.01);
(Continued)

(58) Field of Classification Search
CPC ............ B60H 1/00535; B60H 1/00364; B60H 1/00542; B60H 2001/00235;
(Continued)

(56) References Cited

U.S. PATENT DOCUMENTS 964,146 A 7/1910 Clark
RE24,637 E 4/1959 Wulle
(Continued)

FOREIGN PATENT DOCUMENTS

AU 2007202766 11/2013
AU 367405 3/2016
(Continued)

OTHER PUBLICATIONS

Design U.S. Appl. No. 29/682,265 entitled "Air Conditioning Apparatus" filed Mar. 4, 2019.
(Continued)

*Primary Examiner* — Lionel Nouketcha
(74) *Attorney, Agent, or Firm* — Middleton Reutlinger

(57) ABSTRACT

A frame is provided and is adapted to be installed in an opening and between the external unit and the roof or wall and having locating elements on each of a first side and an opposite second side of the frame, the locating elements or projections being configured together to locate the frame in the opening and to locate the frame in the external unit. The locating elements in the frame are positioned so that if the opening is the first type, the frame is adapted to be installed with the first side facing the roof or wall, and if the opening is the second type, the frame is adapted to be installed with the first side facing the external unit.

7 Claims, 8 Drawing Sheets

(52) U.S. Cl.
CPC ............ *B60H 2001/00235* (2013.01); *E04D 13/0305* (2013.01); *F24F 1/027* (2013.01)

(58) Field of Classification Search
CPC . B60H 1/00207; B60H 1/00371; F24F 1/027; E04D 13/0305
See application file for complete search history.

(56) References Cited

U.S. PATENT DOCUMENTS

| | | |
|---|---|---|
| 3,092,009 A | 6/1963 | Goettl |
| 3,115,082 A | 12/1963 | Sanoff |
| 3,528,359 A | 9/1970 | Robert et al. |
| 3,680,468 A | 8/1972 | Schueler |
| D226,381 S | 2/1973 | Harty |
| 3,727,537 A | 4/1973 | Harty, Jr. |
| 3,867,486 A | 2/1975 | Nagele |
| 3,974,755 A | 8/1976 | Honmann |
| 4,189,987 A | 2/1980 | Amberg et al. |
| D257,637 S | 12/1980 | Armbruster |
| 4,502,368 A | 3/1985 | Hempel |
| 4,502,467 A | 3/1985 | Smith |
| 4,550,648 A | 11/1985 | Eagle |
| D284,025 S | 5/1986 | Armstrong |
| 4,608,834 A | 9/1986 | Rummel |
| 4,637,299 A | 1/1987 | Harding |
| 4,641,502 A | 2/1987 | Aldrich et al. |
| 4,665,804 A | 5/1987 | Miyasaka |
| 4,672,818 A | 6/1987 | Roth |
| 4,690,040 A | 9/1987 | Barnett |
| 4,693,174 A | 9/1987 | Anderson |
| 4,709,623 A | 12/1987 | Roth et al. |
| D296,583 S | 7/1988 | Barradas |
| 4,760,773 A | 8/1988 | Pezzulli |
| D300,777 S | 4/1989 | Bales et al. |
| D306,341 S | 2/1990 | Venmar et al. |
| 4,995,243 A | 2/1991 | Ward |
| 5,005,372 A | 4/1991 | King |
| 5,056,262 A | 10/1991 | Schweiss et al. |
| 5,176,570 A | 1/1993 | Liedl |
| 5,203,178 A | 4/1993 | Shyu |
| D343,894 S | 2/1994 | Anderson |
| 5,307,645 A | 5/1994 | Pannell |
| 5,366,149 A | 11/1994 | Kline |
| 5,403,183 A | 4/1995 | Andersson et al. |
| D360,681 S | 7/1995 | Chopko |
| 5,435,781 A | 7/1995 | Kitchens |
| D367,524 S | 2/1996 | Waldschmidt et al. |
| 5,494,244 A | 2/1996 | Walton |
| 5,501,083 A | 3/1996 | Kim |
| 5,501,634 A | 3/1996 | Wilder |
| 5,531,641 A | 7/1996 | Aldrich |
| 5,556,335 A | 9/1996 | Holyoake |
| 5,588,910 A | 12/1996 | Hutter et al. |
| 5,632,156 A | 5/1997 | Takeo et al. |
| 5,643,081 A | 7/1997 | Klein |
| D391,632 S | 3/1998 | Thomas |
| 5,727,998 A | 3/1998 | Krueger et al. |
| 5,752,877 A | 5/1998 | Sun |
| 5,765,383 A | 6/1998 | Inoue |
| 5,771,704 A | 6/1998 | Nakajima et al. |
| 5,791,156 A | 8/1998 | Strautman et al. |
| 5,860,856 A | 1/1999 | Teich et al. |
| 5,863,310 A | 1/1999 | Brown et al. |
| 5,964,910 A | 10/1999 | Keele |
| D424,184 S | 5/2000 | Chang-Kwon |
| 6,066,041 A | 5/2000 | Hernandez et al. |
| 6,073,456 A | 6/2000 | Kawai et al. |
| 6,076,370 A | 6/2000 | Da Silva |
| D428,480 S | 7/2000 | Flanagan |
| 6,101,829 A | 8/2000 | Robinson |
| 6,149,513 A | 11/2000 | Lyu |
| D435,639 S | 12/2000 | Robert et al. |
| 6,171,062 B1 | 1/2001 | Bucher et al. |
| D437,396 S | 2/2001 | Flanagan |
| 6,196,914 B1 | 3/2001 | Lyu |
| 6,220,045 B1 | 4/2001 | Kim |
| 6,234,893 B1 | 5/2001 | Meredith |
| 6,241,794 B1 | 6/2001 | Jadran et al. |
| 6,250,373 B1 | 6/2001 | Vecchi et al. |
| 6,257,976 B1 | 7/2001 | Richardson, III |
| 6,302,780 B1 | 10/2001 | Ahn et al. |
| 6,339,934 B1 | 1/2002 | Yoon et al. |
| D454,625 S | 3/2002 | Flanagan |
| 6,351,957 B2 | 3/2002 | Hara |
| 6,367,270 B2 | 4/2002 | Niimi et al. |
| 6,370,899 B1 | 4/2002 | Hobbs et al. |
| 6,370,906 B1 | 4/2002 | Kuo |
| 6,415,622 B2 | 7/2002 | Kim et al. |
| 6,536,222 B1 | 3/2003 | Ahn et al. |
| 6,554,880 B1 | 4/2003 | Northcutt |
| 6,571,572 B1 | 6/2003 | Hobbs et al. |
| 6,601,356 B2 | 8/2003 | Snyder |
| 6,616,523 B1 | 9/2003 | Tani et al. |
| 6,626,003 B1 | 9/2003 | Kortum et al. |
| 6,745,586 B1 | 6/2004 | Reimann et al. |
| D495,041 S | 8/2004 | Thomas |
| 6,814,660 B1 | 11/2004 | Cavett |
| 6,857,953 B2 | 2/2005 | Malott |
| 6,889,762 B2 | 5/2005 | Zeigler et al. |
| 7,086,740 B2 | 8/2006 | Sample et al. |
| 7,140,192 B2 | 11/2006 | Allen et al. |
| 7,171,822 B2 | 2/2007 | Allen et al. |
| D538,413 S | 3/2007 | Lyu et al. |
| 7,201,010 B2 | 4/2007 | Homan et al. |
| D541,917 S | 5/2007 | Pfeiffer |
| 7,234,315 B2 | 6/2007 | Allen et al. |
| 7,237,397 B2 | 7/2007 | Allen |
| D554,544 S | 11/2007 | Englert |
| D560,785 S | 1/2008 | Galeazzi |
| 7,316,119 B2 | 1/2008 | Allen |
| 7,334,834 B2 | 2/2008 | Hill et al. |
| 7,441,414 B2 | 10/2008 | Zeihr et al. |
| 7,448,227 B2 | 11/2008 | Zeigler et al. |
| 7,454,922 B2 | 11/2008 | Zeigler et al. |
| 7,468,588 B2 | 12/2008 | Yoo et al. |
| 7,591,143 B2 | 9/2009 | Zeigler et al. |
| 7,591,303 B2 | 9/2009 | Zeigler et al. |
| D619,151 S | 7/2010 | Tsuji |
| 7,797,958 B2 | 9/2010 | Alston et al. |
| 7,832,221 B2 | 11/2010 | Wijaya et al. |
| D629,094 S | 12/2010 | Thomas |
| 7,845,187 B2 | 12/2010 | Patel et al. |
| 7,934,387 B2 | 5/2011 | Lee et al. |
| 7,963,117 B2 | 6/2011 | Allen et al. |
| 8,015,833 B2 | 9/2011 | Cikanek et al. |
| 8,096,482 B2 | 1/2012 | Dage |
| 8,171,866 B2 | 5/2012 | Dunstan |
| D661,386 S | 6/2012 | Bergin |
| 8,249,749 B2 | 8/2012 | Dage et al. |
| D672,450 S | 12/2012 | Milks et al. |
| 8,453,722 B2 | 6/2013 | Zeigler et al. |
| 8,504,209 B2 | 8/2013 | Gross et al. |
| 8,535,127 B2 | 9/2013 | Malott |
| 8,568,209 B2 | 10/2013 | Boxum |
| D712,531 S | 9/2014 | Bergin |
| D715,907 S | 10/2014 | Bergin |
| D716,925 S | 11/2014 | Bergin |
| 9,494,158 B2 | 11/2016 | Pham et al. |
| D782,939 S | 4/2017 | Allard |
| 9,631,832 B2 | 4/2017 | Malott |
| D785,771 S | 5/2017 | Bergin et al. |
| D785,772 S | 5/2017 | Bergin et al. |
| D811,566 S | 2/2018 | Liu et al. |
| D817,466 S | 5/2018 | Moseley |
| D824,499 S | 7/2018 | Williamson et al. |
| 10,093,152 B2 | 10/2018 | Allard et al. |
| D841,138 S | 2/2019 | Williamson et al. |
| D850,609 S | 6/2019 | Bergin |
| D862,668 S | 10/2019 | Moseley |
| D865,926 S | 11/2019 | Moseley |
| 10,675,941 B2 | 6/2020 | Olinda et al. |
| 11,034,208 B2 | 6/2021 | Williamson et al. |
| 2001/0053668 A1 | 12/2001 | Berger |
| 2002/0094714 A1 | 7/2002 | Matsuda et al. |

(56) References Cited

U.S. PATENT DOCUMENTS

| | | |
|---|---|---|
| 2003/0162492 A1 | 8/2003 | Caferro et al. |
| 2003/0220070 A1 | 11/2003 | Orendorff |
| 2004/0005854 A1 | 1/2004 | Shin |
| 2004/0038643 A1 | 2/2004 | Katagiri et al. |
| 2004/0072532 A1 | 4/2004 | Cho |
| 2005/0087332 A1 | 4/2005 | Umeo et al. |
| 2005/0227609 A1 | 10/2005 | Koessler |
| 2006/0026936 A1 | 2/2006 | Paumier et al. |
| 2006/0052050 A1 | 3/2006 | Malott et al. |
| 2006/0059932 A1 | 3/2006 | Czechowicz |
| 2006/0083889 A1 | 4/2006 | Schuckers |
| 2007/0000265 A1 | 1/2007 | McEnaney et al. |
| 2007/0066215 A1 | 3/2007 | Song et al. |
| 2007/0131408 A1 | 6/2007 | Zeigler et al. |
| 2007/0156289 A1 | 7/2007 | Altieri et al. |
| 2007/0157522 A1 | 7/2007 | Hebert et al. |
| 2007/0227693 A1 | 10/2007 | Allen et al. |
| 2007/0287374 A1 | 12/2007 | Day et al. |
| 2007/0299560 A1 | 12/2007 | LaHue et al. |
| 2008/0014852 A1 | 1/2008 | Mielke et al. |
| 2008/0034767 A1 | 2/2008 | Ziehr et al. |
| 2008/0146136 A1 | 6/2008 | Degutis et al. |
| 2009/0098820 A1 | 4/2009 | Yabu |
| 2010/0006257 A1 | 1/2010 | Schutz |
| 2010/0089563 A1 | 4/2010 | Sundhar et al. |
| 2010/0120345 A1 | 5/2010 | Ryan |
| 2010/0224754 A1 | 9/2010 | Khan et al. |
| 2011/0016894 A1 | 1/2011 | Lemon et al. |
| 2011/0067420 A1 | 3/2011 | Alston et al. |
| 2011/0146320 A1 | 6/2011 | Tomiyama et al. |
| 2011/0302942 A1 | 12/2011 | Birchard |
| 2012/0210733 A1 | 8/2012 | Kolavennu et al. |
| 2012/0247131 A1 | 10/2012 | Esch |
| 2012/0324927 A1 | 12/2012 | Suzuki |
| 2013/0047648 A1 | 2/2013 | Zeigler et al. |
| 2013/0109294 A1 | 5/2013 | Tolinski et al. |
| 2013/0168064 A1 | 7/2013 | Akiyoshi et al. |
| 2013/0205811 A1 | 8/2013 | Esch |
| 2014/0033742 A1 | 2/2014 | Esch |
| 2014/0188313 A1 | 7/2014 | Huang |
| 2014/0223928 A1 | 8/2014 | Esch |
| 2014/0260393 A1 | 9/2014 | Siddiqui et al. |
| 2015/0087216 A1 | 3/2015 | Stover et al. |
| 2015/0107814 A1 | 4/2015 | Jeong |
| 2015/0251521 A1 | 9/2015 | Brauer et al. |
| 2015/0352924 A1 | 12/2015 | Allard et al. |
| 2016/0033185 A1 | 2/2016 | Motokawa et al. |
| 2016/0076271 A1 | 3/2016 | Reinking |
| 2016/0207372 A1 | 7/2016 | Parry |
| 2017/0203632 A1 | 7/2017 | Westendarp et al. |
| 2019/0047353 A1 | 2/2019 | Williamson et al. |
| 2019/0047354 A1 | 2/2019 | Williamson et al. |
| 2019/0315197 A1 | 10/2019 | Williamson et al. |
| 2020/0298655 A1 | 9/2020 | Williamson et al. |

FOREIGN PATENT DOCUMENTS

| | | |
|---|---|---|
| AU | 201612249 | 5/2016 |
| AU | 201613590 | 7/2016 |
| AU | 201613591 | 7/2016 |
| AU | 201613592 | 7/2016 |
| AU | 201613593 | 7/2016 |
| AU | 201712794 | 5/2017 |
| AU | 201712798 | 5/2017 |
| AU | 2017222698 A1 | 8/2018 |
| AU | 2017222697 A1 | 9/2018 |
| AU | 2019202512 A1 | 10/2019 |
| CA | 1011592 A | 6/1977 |
| CA | 2518348 | 3/2006 |
| CA | 2587994 | 12/2007 |
| CA | 2611822 | 5/2008 |
| CA | 2951956 | 12/2015 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CN | 202126056 U | 1/2012 |
| CN | 203533804 U | 4/2014 |
| CN | 105142941 A | 12/2015 |
| CN | 204923367 U | 12/2015 |
| CN | 106470856 | 3/2017 |
| CN | 109070688 A | 12/2018 |
| CN | 305029216 | 2/2019 |
| CN | 305105066 S | 4/2019 |
| CN | 305397384 S | 10/2019 |
| DE | 10336767 | 12/2004 |
| DE | 202004017266 U1 | 4/2006 |
| DE | 112017000915 T5 | 10/2018 |
| DE | 102019205194 | 10/2019 |
| EP | 0180053 A2 | 5/1986 |
| EP | 0064769 B1 | 8/1986 |
| EP | 700801 | 3/1996 |
| EP | 1634740 | 3/2006 |
| EP | 1681517 A1 | 7/2006 |
| EP | 1832452 A2 | 9/2007 |
| EP | 1870270 | 12/2007 |
| EP | 1925889 | 5/2008 |
| EP | 2196390 | 6/2010 |
| EP | 003323740-0001 | 7/2016 |
| EP | 003421643-0001 | 10/2016 |
| EP | 003479179-0001 | 11/2016 |
| EP | 003479179-0002 | 11/2016 |
| EP | 3113965 | 1/2017 |
| EP | 3411250 A1 | 12/2018 |
| FR | 2087220 A7 | 12/1971 |
| GB | 2297157 A | 7/1996 |
| JP | S52137854 A | 11/1977 |
| JP | H01224484 A | 9/1989 |
| JP | 2004125338 A | 4/2004 |
| JP | 2009225552 A | 10/2009 |
| JP | 2011038699 A | 2/2011 |
| KR | 20070060394 | 6/2007 |
| KR | 20080065198 A | 7/2008 |
| WO | 2004099681 A1 | 11/2004 |
| WO | 2014143181 A1 | 9/2014 |
| WO | 2015131235 | 9/2015 |
| WO | 2015134185 A1 | 9/2015 |
| WO | 2017143393 | 8/2017 |
| WO | 2017143394 A1 | 8/2017 |
| WO | 2019038023 A1 | 2/2019 |
| WO | 2019097448 A1 | 5/2019 |
| WO | 2019229706 A1 | 12/2019 |

OTHER PUBLICATIONS

Utility U.S. Appl. No. 16/722,938 entitled "Roof Top Air Conditioner Unit, Methods for Producing, Assembling and Installing the Roof Top Air Conditioner Unit and Vehicle with the Roof Top Air Conditioner Unit" filed Dec. 20, 2019.
Utility U.S. Appl. No. 16/384,376 entitled "Air Distribution Apparatus" filed Apr. 15, 2019.
Design U.S. Appl. No. 29/660,094 entitled "Air Distribution Box" filed Aug. 17, 2018.
Design U.S. Appl. No. 29/645,887 entitled "Mobile Air Conditioner" filed Apr. 30, 2018.
U.S. Appl. No. 62/819,711 entitled "Mobile Air Conditioner" filed Mar. 18, 2019.
Utility U.S. Appl. No. 16/744,584 entitled "Parking Cooler" filed Jan. 16, 2020.
Examination report Issued in AU Patent Application No. 2017222698 dated Dec. 13, 2021.
Corrected Notice of allowance Issued in U.S. Appl. No. 16/895,813 dated Jul. 14, 2022.
10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014 https://web.archive.org/web/20140323013456/ http://www.americanrvcompany.com/Dometic-459530-Duo-Therm-13500-BTU-Brisk-Air-Conditioner-High-Efficiency-Upper-Unit-Trailer-Camper-RV Mar. 23, 2014.

(56) References Cited

OTHER PUBLICATIONS

American RV Company, Dometic 541815 High Performance 13,500 BTU Air Conditioner Upper Unit CCC2 Required Electronics Pre-Installed Camper Trailer RV, http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV.
American RV Company, Dometic 551816 High Performance 15,000 BTU Heat Pump for Comfort Control Center II Camper Trailer RV, http://www.americanrvcompany.com/Dometic-551816-High-Performance 15000-BTU-Heat-Pump-for-Comfort-Control-Center-II-Camper-Trailer-RV Mar. 23, 2014.
Boyang(BOYARD), Rotary compressor KFA102Z220 for air conditioning, http://www.hvacrcompressor.com/boyangboyard-rotary-compressor-kfa102z220-for-air-conditioning.
Dirna Bergstrom: Parking Coolers—No-Idle Electrical A/C—MiniCool Compact 1.4; http://www.dirna.com/parking-coolers-no-idle-electrical-ac-compact/ Mar. 17, 2015.
Dirna Bergstrom: Slim Cool; http://www.dirna.com/files/dirna-manuals/220RE00183.pdf May 21, 2014.
Domestic Corporation, Dometic High Performance Air Conditioners, 2 pages, Jan. 1, 2011.
Dometic Duo-Therm, p. 140.
Dometic Group: "Climate Control", http://www.dometic.com/enus/Americas/USA/RV-Products/climate, 2 pages.
Dometic Waeco Coolair RT 880; http://www.dometic.co.uk/product/waeco-coolair-rt-880-2/ May 14, 2015.
EBERSPACHER Cooltronic Parking Coolers with High Efficiency with the Engine OFF; http://www.eberspacher.com/products/air-conditioning/cooltronic-truck-parking-coolers.html Jun. 23, 2015.
Indelb; WO Oblo'; Sleeping Well Oblo; http://www.indelb.com/products/parking_air_cooler/sleeping_well/sw_oblo Apr. 1, 2016.
Samsung, 360 Cassette, All-round Cool, http://www.samsung.com/au/air-conditioning/fjm-air-conditioners/NJ050DHXEAXSA.html.
WEBASTO: Rooftop air conditioning systems: Rooftop 3.5-9.9 kw; http://www.eberspacher.com/products/air-conditioning/cooltronic-truck-parking-coolers.html May 14, 2014.
WEBASTO; Truck parking cooler: Cool Top Vario 10 E; http://www.webasto.com/GB/markets-products/truck/air-conditioning/products/cool-top-vario/ Apr. 25, 2016.
YOUTUBE; Viesa Kompressor; https://www.youtube.com/watch?v=SPK17XEvVLO May 22, 2012 https://www.google.com/?gws_rd-ssl#q=https://www.youtube.com/watch?v%3DSPK17XEvVLO&spf-1495819902591).
Extended European Search Report for EP Patent Application No. 17755646.1 dated Sep. 4, 2019.
Non-Final Office Action for Design U.S. Appl. No. 29/573,473 dated May 9, 2017.
Non-Final Office Action for Design U.S. Appl. No. 16/078,464 dated Sep. 27, 2019.
Canadian Intellectual Property Office, Office Action for App. No. 167431 dated Oct. 8, 2016.
Notice of Allowance for Design U.S. Appl. No. 29/573,473 dated Oct. 16, 2017.
Notice of Allowance for Design U.S. Appl. No. 29/573,473 dated Jan. 12, 2018.
International Search Report and Written Opinion for for PCT Patent Application No. PCT/US2013/065458 dated Jan. 29, 2014.
International Search Report and Written Opinion of the International Searching Authority for PCT/AU2017/050154 dated Apr. 13, 2017.
International Preliminary Report on Patentability for PCT Patent Application No. PCT/AU2017/050153 dated Aug. 28, 2018.
International Preliminary Report on Patentability for PCT/AU2017/050154 dated Aug. 28, 2018.
AU Provisional Patent Application No. 2016900617 entitled "Vehicle air conditioner" filed on Feb. 22, 2016.
AU Provisional Patent Application No. 2016900627 entitled "Air-Conditioner Control" filed on Feb. 22, 2016.
Australian Patent Application 2017200186 entitled "Parking Cooler" filed Jan. 11, 2017.
Canadian Patent Application 2,906,348 entitled "Modular Air Grill Assembly" as filed Sep. 14, 2015 (national stage entry date).
Chinese Patent Application 201710040123.1 entitled "Parking Cooler" filed Jan. 18, 2017.
European Design Patent Application No. 003300219 entitled "Air Shroud Assembly" filed Jul. 8, 2016.
European Patent Application 17152275.8 entitled "Parking Cooler" filed Jan. 19, 2017.
Design U.S. Appl. No. 29/552,019 entitled "Air Shroud Assembly" dated Jan. 19, 2016.
Design U.S. Appl. No. 29/581,176 entitled "Air-Conditioning Unit" dated Oct. 17, 2016.
Design U.S. Appl. No. 29/594,476 entitled "Shroud Assembly" filed Feb. 17, 2017.
Design U.S. Appl. No. 29/604,433 entitled "Air Conditioning Apparatus" filed May 17, 2017.
Utility U.S. Appl. No. 15/407,709 entitled "Parking Cooler" filed Jan. 17, 2017.
Intention to Grant for European Application No. 17755646.1 dated May 27, 2020.
Examination report DE Patent Application No. 112017000915.4 dated Jun. 16, 2020 (Summary in English attached).
U.S. Appl. No. 16/895,813 entitled "Air-Conditioner Control" filed Jun. 8, 2020.
Decision to Grant mailed in EP Patent Application No. 177556461 dated Sep. 21, 2020.
Corrected Notice of Allowance for U.S. Appl. No. 16/078,478 dated May 7, 2021.
Notice of Allowance for U.S. Appl. No. 16/078,478 dated Jan. 14, 2021.
Non-Final Office Action for U.S. Appl. No. 16/078,478 dated Jun. 9, 2020.
Non Final Office Action Issued in U.S. Appl. No. 16/895,813 dated Feb. 28, 2022.
Notice of Acceptance Issued in AU Patent Application No. 2017222697 dated Jun. 6, 2022.
Notice of allowance Issued in U.S. Appl. No. 16/895,813 dated Jun. 15, 2022.
Australian Patent Office, International Search Report and Written Opinion for PCT/AU2017/050153 dated Apr. 19, 2017.
Truma, Aventa Comfort (Australia) Operating Instructions Installation Instructions, Oct. 21, 2013, pp. 1-16 [retrieved from internet on Aug. 21, 2018], https://www.truma.com/downloadcenter/aventa_comfort_operation_installation_aus.pdf.
"Aventa Comfort Operating Instructions Installation Instruction" Retrieved From https://suncoastcaravanservice.com.au/wp-content/uploads/2020/02/Truma-Aventa-Comfort-Installation-Manual.pdf, Published by Leisure-Tec Australia Pty. Ltd, Feb. 2020, 8 Pages.
Office Action for CN Patent Application No. 201780024147.6 dated Apr. 6, 2021.
Examination report Issued in AU Patent Application No. 2017222697 dated Jul. 13, 2021.
Notice of Grant issued in AU Patent Application No. 2017222698 dated Sep. 29, 2022.
Office Action for German Patent Application No. 112017000915.4 dated Oct. 20, 2022.

FRAME FITTING ARRANGEMENT FOR VEHICLE AIR CONDITIONER

CLAIM TO PRIORITY

This divisional patent application claims priority to and benefit of, under 35 U.S.C. § 121, U.S. patent application Ser. No. 16/078,478, filed Aug. 21, 2018 and titled "Vehicle Air Conditioner", issuing as U.S. Pat. No. 11,034,208 on Jun. 15, 2021, which claims priority to and benefit of, under 35 U.S.C. § 119(e), PCT application number PCT/AU2017/050153, filed Feb. 22, 2017, titled, "Vehicle Air Conditioner", which claims priority to Australian patent application AU 2016900617, filed Feb. 22, 2016, all of which is incorporated by reference herein.

FIELD OF THE INVENTION

The present embodiments relate to air conditioners for vehicles including but not limited to recreational road vehicles such as caravans, mobile homes and the like, and in particular to an air-conditioner with an improved system of attachment to the vehicle.

BACKGROUND OF THE INVENTION

There are a number of manufacturers of air-conditioners for recreational vehicles who supply air-conditioners which must be fitted to a range of recreational vehicles of different sizes. Many recreational vehicles are manufactured with square openings or cut-out sections in the roof ready for installation of an air-conditioner, which are typically one of two sizes—a square 360 mm on each side or 400 mm on each side. This presents a problem to the manufacturer of air-conditioners on how to adapt installation to 2 different opening sizes, at the same time as keeping manufacture and parts numbers at a minimum.

It is an object of the present embodiment to overcome or ameliorate at least one of the disadvantages of the prior art, or to provide a useful alternative.

It is an object, in at least one form, to provide an improved air-conditioner to overcome the above disadvantage, applicable to recreational and other vehicles.

SUMMARY OF THE INVENTION

According to a first broad aspect, there is provided an air-conditioner adapted to be fitted to a vehicle, the air conditioner comprising:

an external unit containing a compressor and at least one heat exchanger element and having at least one air channel positioned for supplying conditioned air and at least one air channel positioned for receiving return air through an opening in a roof or wall of the vehicle, wherein the opening is either a first type or a second type having a different size from the first type;

a frame adapted to be installed in the opening and between the external unit and the roof or wall and having locating elements on each of a first side and an opposite second side of the frame, the locating elements being configured together to locate the frame in the opening and to locate the frame in the external unit;

wherein the locating elements in the frame are positioned so that if the opening is the first type, the frame is adapted to be installed with the first side facing the roof or wall, and if the opening is the second type, the frame is adapted to be installed with the first side facing the external unit.

In one embodiment, the locating elements on the first side of the frame comprise a projection adapted to engage with a side of the opening of the first type, and one of the locating elements on the second side is adapted to engage with a locating element in the external unit, when first side is facing the roof or wall.

In one embodiment, the locating elements on the first side of the frame comprise a first side projection adapted to engage with a side of the opening of the first type when the first side is facing the roof or wall, and the locating elements on the second side of the frame comprise a second side projection adapted to engage with a first external unit locating element in the external unit, when the first side is facing the roof or wall; and the second side projection is adapted to engage with the side of the opening of the second type when the first side is facing the external unit, and the first side projection is adapted to engage with a second external unit locating element in the external unit when the first side is facing the external unit.

One or more of the first side projection, second side projection, first external unit locating element and second external unit locating element may comprise ridges engaging the sides of the opening. The ridges may be tapered to facilitate location with the sides of the opening or the external unit.

In one embodiment, one or more of the locating elements in the frame is a recess or hole adapted to engage with a projection in the external unit.

In one embodiment, the frame comprises a duct insert adapted to be installed in the frame in either of two orientations appropriate to installation in the first type or second type of opening respectively, the duct insert providing a duct for directing supply air into indoor componentry of the air-conditioner. Also included may be a telescopic duct size adjuster adapted to slidingly engage with the duct insert and to be fitted into the indoor componentry so as to telescopically adjust an operational length of the duct to accommodate different roof or wall thicknesses. The duct may be heat insulated to reduce heat to transfer between the supply air and the return air.

In one embodiment, also included is a ceiling plate adapted to be installed in an interior of the vehicle on the ceiling over the opening and fixed through the opening with bolts into the external unit. A fascia cover may be included which is adapted to be installed on the ceiling plate.

According to a second broad aspect of the embodiments there is provided a frame adapted to be installed in an opening in a roof or wall of a vehicle between an external unit of an air-conditioner and the roof or wall, the opening being either a first type or a second type having a different size from the first type, the external unit containing a compressor and at least one heat exchanger element and having at least one air channel positioned for supplying conditioned air and at least one air channel position for receiving return air through the opening;

wherein: the frame has locating elements on each of a first side and an opposite second side of the frame, the locating elements being configured together to locate the frame in the opening and to locate the frame in the external unit; and the locating elements in the frame are positioned so that if the opening is the first type, the frame is adapted to be installed with the first side facing the roof or wall, and if the opening is the second type, the frame is adapted to be installed with the first side facing the external unit.

A third aspect provides a method of installing the air conditioner in a roof or wall of a vehicle, the method comprising the steps of:

revealing or constructing an opening in the roof or wall of the vehicle, wherein the opening is either a first type or a second type having a different size from the first type;

fitting the frame into the opening, if the opening is the first type, the frame is installed with the first side facing the roof or wall, and if the opening is the second type, the frame is installed with the second side facing the roof or wall;

fitting a duct insert into a supply aperture of the frame;

fitting the external unit onto the frame over the opening using the locating elements;

fitting a telescopic duct size adjuster into the duct insert; and fitting a ceiling plate to the external unit from inside the vehicle.

DETAILED DESCRIPTION OF EMBODIMENTS

Figure 1A:
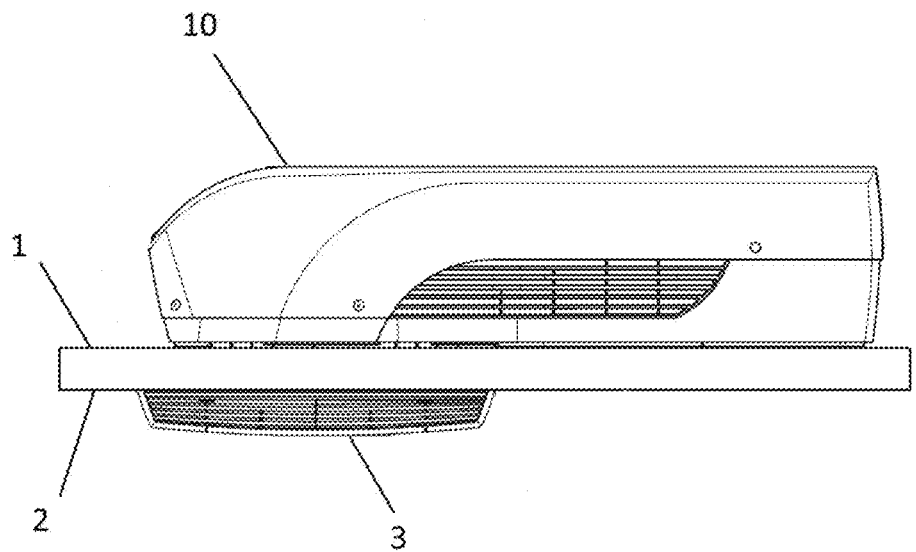
FIGS. 1A and 1B are side and end views respectively of an air-conditioner of an embodiment of the current invention installed in a roof of a recreational vehicle.

Exemplary embodiments of the present invention will now be described in detail with reference to the accompanying drawings. In the drawings, the same elements are denoted by the same reference numerals throughout. In the following description, detailed descriptions of known functions and configurations incorporated herein have been omitted for conciseness and clarity.

Figure 1B:
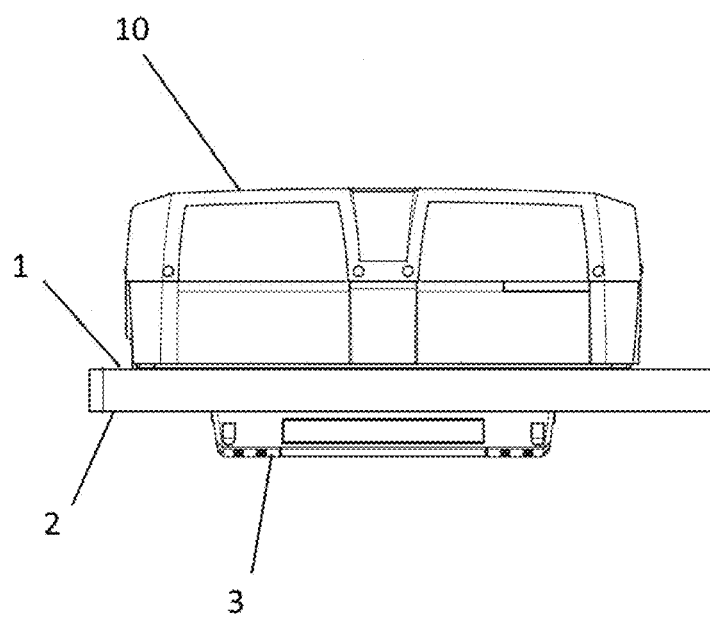

Referring first to FIGS. 1A and 1B, side and end views respectively are shown of an external unit 10 installed on a roof 1 of a recreational vehicle, with indoor componentry 3 attached from below ceiling 2. External unit 10 contains a compressor and heat exchanger elements and has a base (FIG. 8) with air channels positioned for supplying conditioned air and receiving return air through an opening in a roof of the recreational vehicle.

Figure 2:
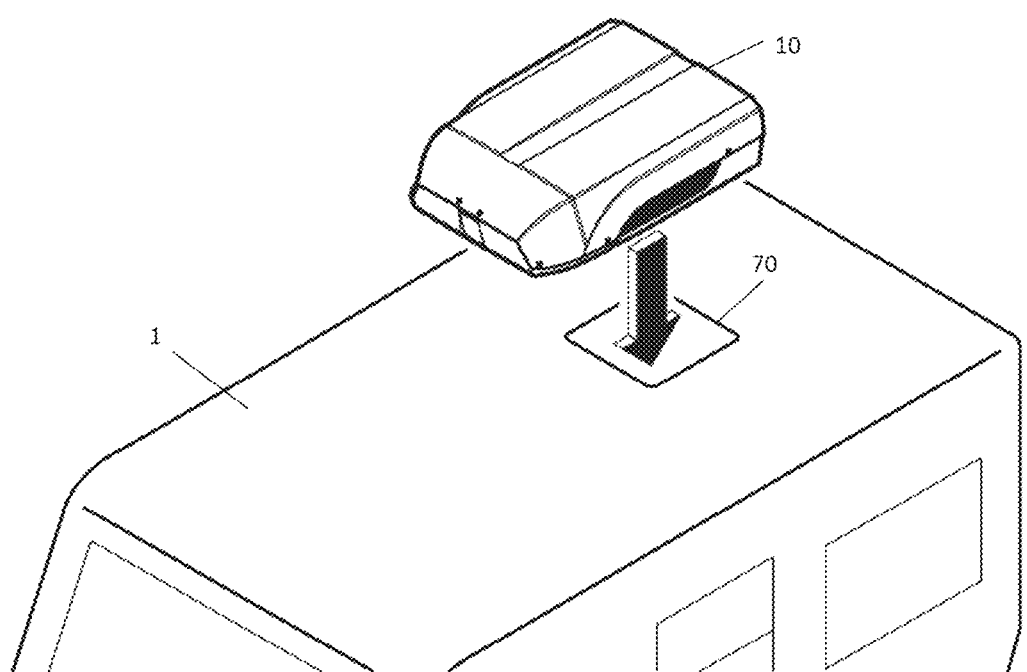
FIG. 2 is a perspective view of an external unit of an air-conditioner of the embodiment of FIG. 1 being installed on a roof of a recreational vehicle.

Referring to FIG. 2, external unit 10 is shown in process of installation onto opening 70 in roof 1. Opening 70 may be a pre-manufactured opening, typically either of a first type having a smaller standard size of about 360 mm×360 mm, or of a second type having a larger standard size of about 400 mm×400 mm. Alternatively, opening 70 may be cut and formed in an intact roof to a first type dimension or a second type dimension according to methods known in the art.

Figure 3:
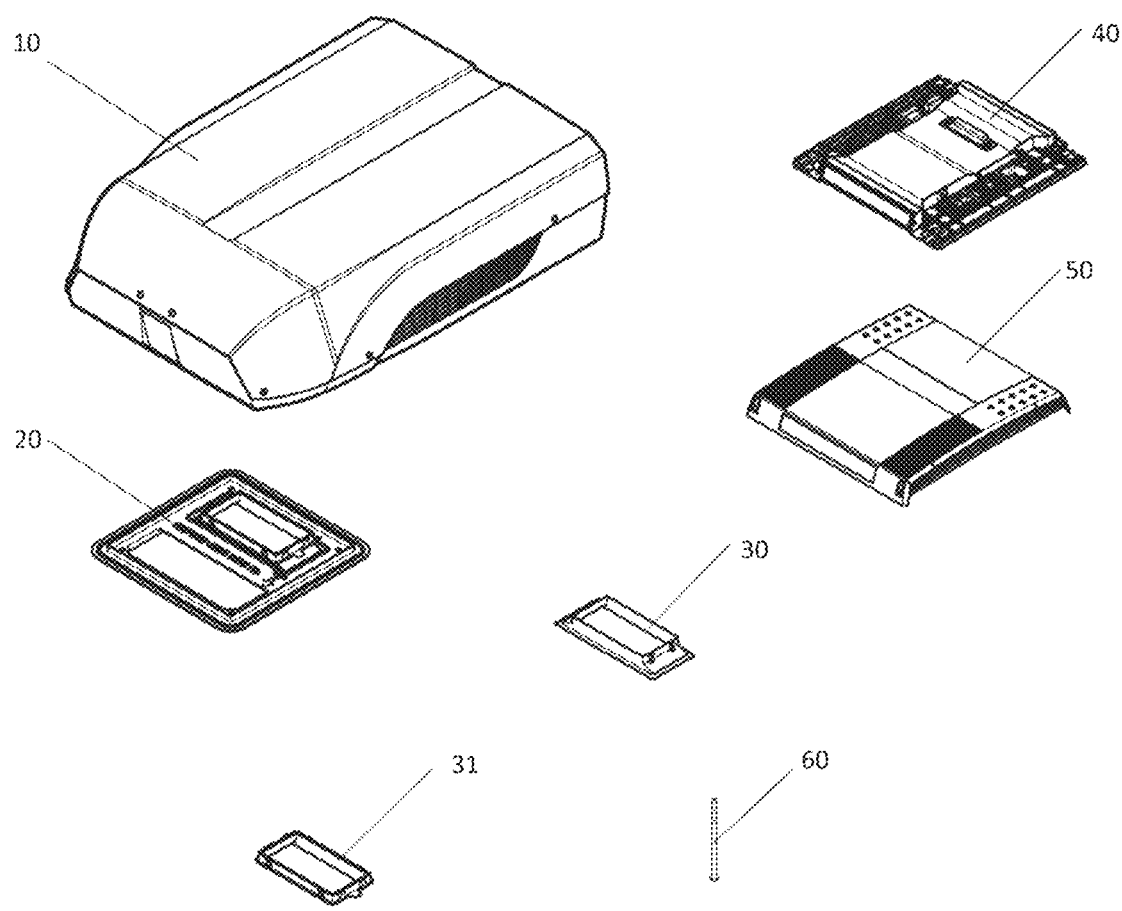
FIG. 3 is an exploded perspective view of separate components of the embodiment of FIG. 1.

Referring now to FIG. 3, various components of the external unit 10 are shown in separated form, including frame 20, duct insert 30, ceiling plate 40, fascia cover 50, telescopic duct size adjuster 31, and bolt 60. The components are typically manufactured primarily in plastic of the appropriate characteristics as is known in the art.

Figure 4:
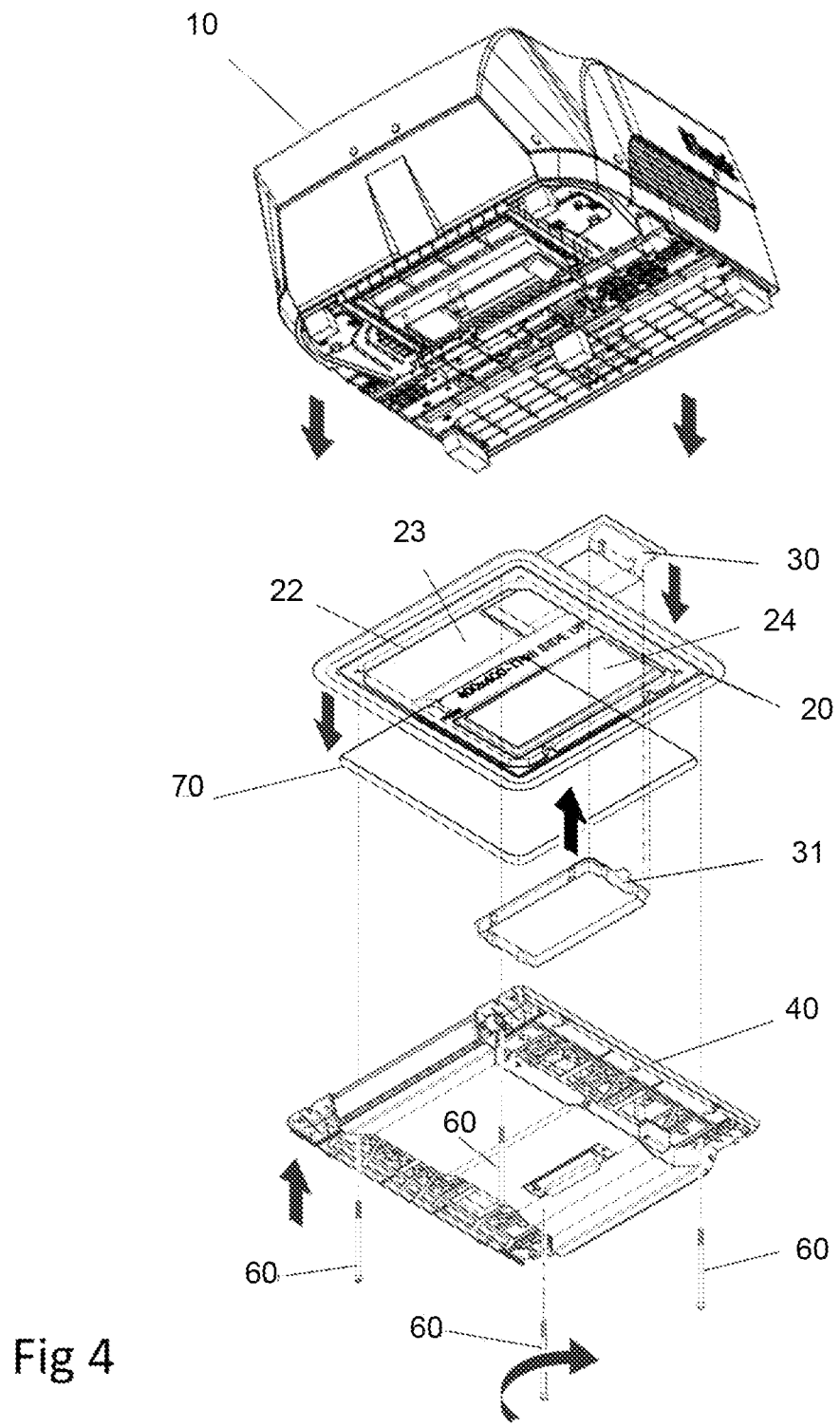
FIG. 4 is a perspective view of the installation procedure of the embodiment of FIG. 1.

Referring now to FIG. 4, an exploded perspective view is shown depicting part of the installation procedure. After revealing or constructing the opening 70, shown disposed in the roof 1 which is represented as transparent for purposes of description, frame 20 is oriented with first or second side facing down toward the roof as described below appropriate to the size of opening 70 and is located into opening 70. It should be appreciated that opening 70 will located in a position on the roof that can support the static weight of the external unit 10 and the loads of the air conditioner when the vehicle is in motion. In this regard, the vehicle manufacturer may have already provided points where the opening for the installation of the roof air conditioner can be made without any risk of weakening the construction or cutting power cables. Alternatively, a flat and sufficiently level area at the center of the vehicle roof should be selected and ideally the roof inclination of the installation surface should not exceed 10°. In FIG. 4, opening 70 is of the smaller standard size. Duct insert 30 is fitted from above into supply aperture 24 before or after location of frame 20 in opening 70. External unit 10 is fitted onto frame 20 over opening 70 using locating elements to be described below. Weatherproof sealant may be used. Telescopic duct size adjuster 31 is fitted onto duct insert 30 from below, either before or after location of frame 20 in opening 70 and fitment of external unit 10. Telescopic duct size adjuster 31 is adapted to slidingly engage with duct insert 30 and to be fitted into the indoor componentry consisting of ceiling plate 40 which is maneuvered from below ceiling into place beneath opening 70. Duct insert 30 and telescopic duct size adjuster 31 are covered in insulating foam material in order to reduce heat transfer between the supply air in the duct and the return air which surrounds the duct. Ceiling plate 40 is fixed to external unit 10 using appropriately dimensioned bolts 60. Fascia cover 50 containing supply and return louvers and control and communication functions is then screwed onto ceiling plate 40 (not shown).

Figure 5A:
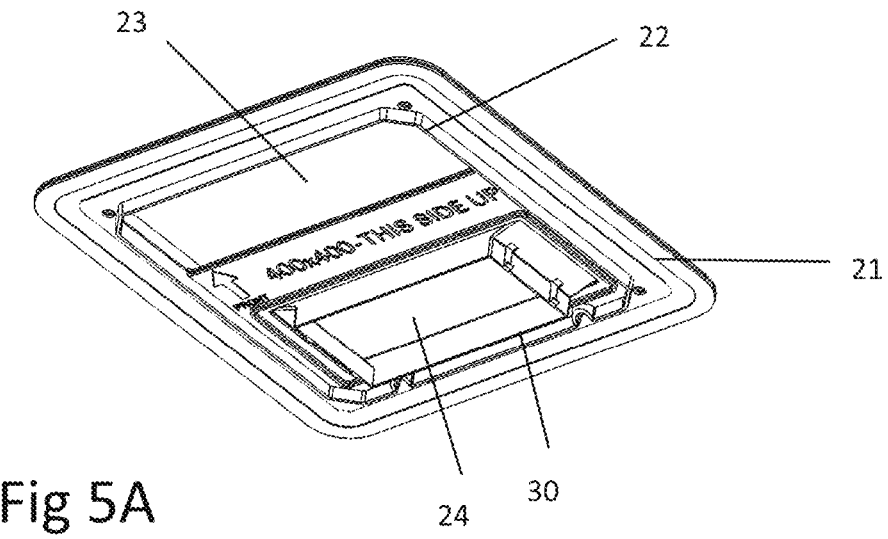
FIGS. 5A and 5B is a perspective view of first and second sides of a frame component of the embodiment of FIG. 1.
Figure 5B:
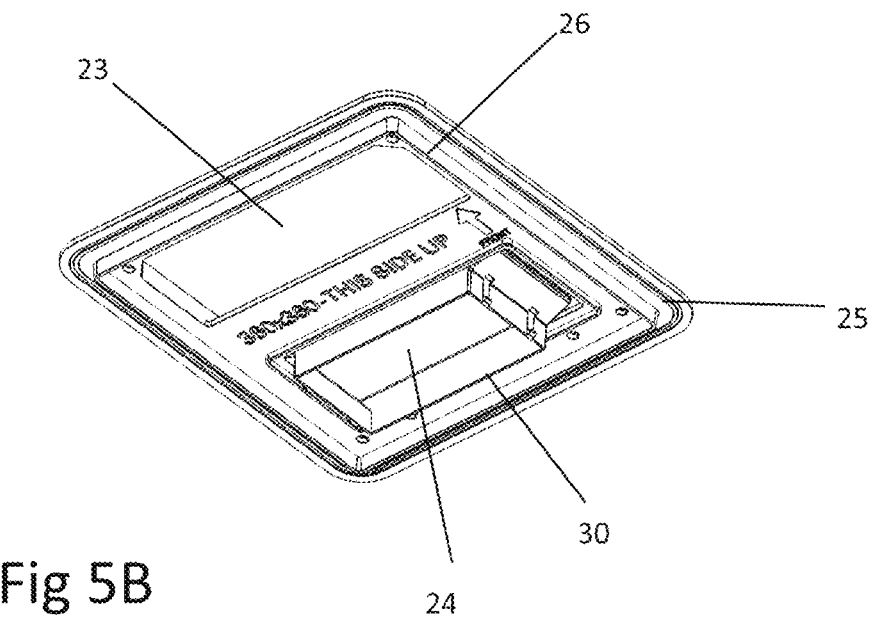

Referring now to FIGS. 5A and 5B, first side 21 and opposite second side 25 respectively of frame 20 are shown in perspective view as if from below oriented as intended for use in an opening of the smaller standard size and the larger standard size respectively. Frame 20 comprises supply air aperture 24 (shown in both figures with duct insert 30 installed from above) and return air aperture 23. Referring in particular to FIG. 5A, extending around supply air aperture 24 and return air aperture 23 is a generally square ridge 22 disposed as a projection out of first side 21. Ridge 22 is generally parallel to sides of opening 70 and sized to fit snugly within opening 70 of the smaller standard size and performs the function of a locating element to locate frame 20 in opening 70 of the smaller standard size. Referring in particular to FIG. 5B, extending around supply air aperture 24 and return air aperture 23 is a similar generally square ridge 26 disposed as a projection out of second side 25. Ridge 26 is generally parallel to sides of opening 70 and sized to fit snugly within opening 70 of the larger standard size and performs the function of a locating element to locate frame 20 in opening 70 of the larger standard size.

When opening 70 is the larger standard size, first side 21 is disposed upwards in installation and ridge 22 serves as a locating element to locate frame 20 into unit 10, while ridge 26 serves as a locating element to locate frame 20 into opening 70. When opening 70 is the smaller standard size, second side 25 is disposed upwards in installation and ridge 25 serves as a locating element to locate frame 20 into unit 10 while ridge 22 serves as a locating element to locate frame 20 into opening 70.

Figure 8:
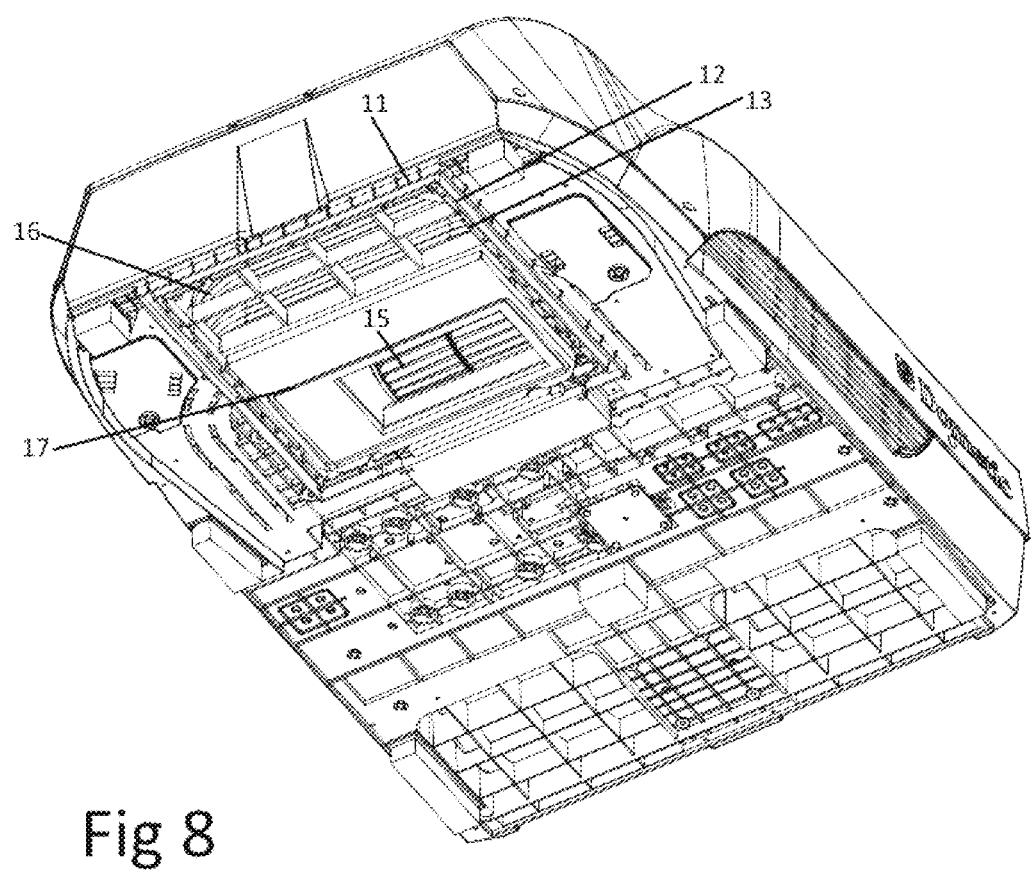
FIG. 8 is a perspective view of an underside of a base of an external unit of the embodiment of FIG. 1.

Referring now to FIG. 8, where a base of the external unit 10 is seen from below, there are generally square ridges 11, 12, 13 provided which surround supply air fan outlet 15 and return air inlet 16. Also seen is a receiving channel 17 corresponding with duct insert 30.

Figure 6A:
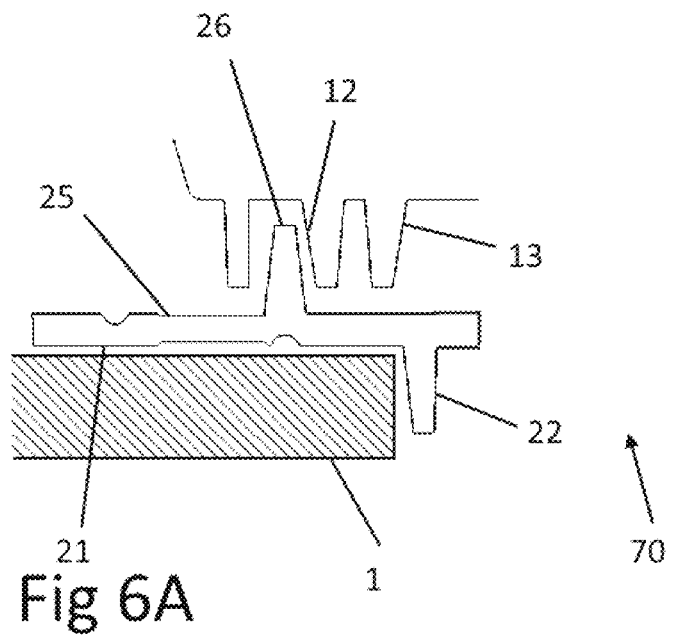
FIGS. 6A and 6B are cross sectional views showing the principle of operation of the frame component of the embodiment of FIG. 1.
Figure 6B:
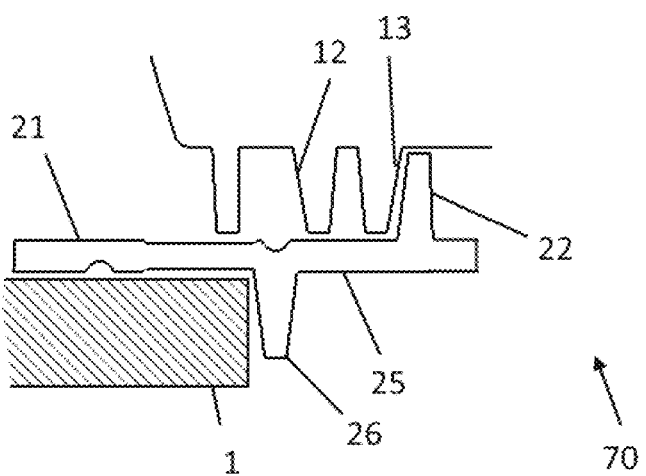

Referring now to FIGS. 6A and 6B, the principle of operation of frame 20 is depicted. Referring first to FIG. 6A, which corresponds to the situation of FIG. 5A installing in an opening 70 of the smaller standard size, first side 21 is facing down toward the roof and projection 22 locates frame 20 against the roof 1 in the opening 70 and projection 26 locates the frame 20 in the base of the external unit against projection 12. Projections 22 and 26 in the frame 20 and projections 12 and 13 in the base of the external unit 10 are tapered to assist in the location process. Referring to FIG. 6B, which corresponds to the situation of FIG. 5B installing in an opening 70 of the larger standard size, first side 21 is facing upwards towards external unit 10 and projection 26 locates frame 20 against the roof 1 in the opening 70, while projection 22 locates frame 20 in the base of the external unit 10 against projection 13.

Figure 7A:
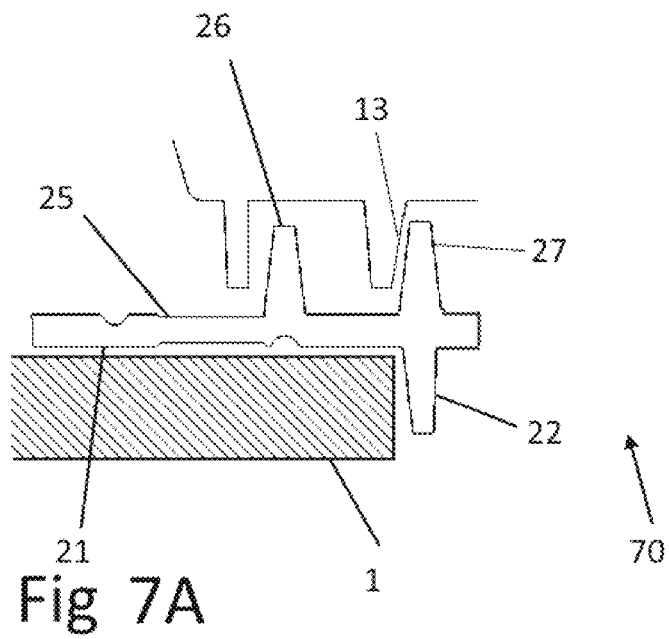
FIGS. 7A and 7B are cross sectional views of an alternative embodiment.
Figure 7B:
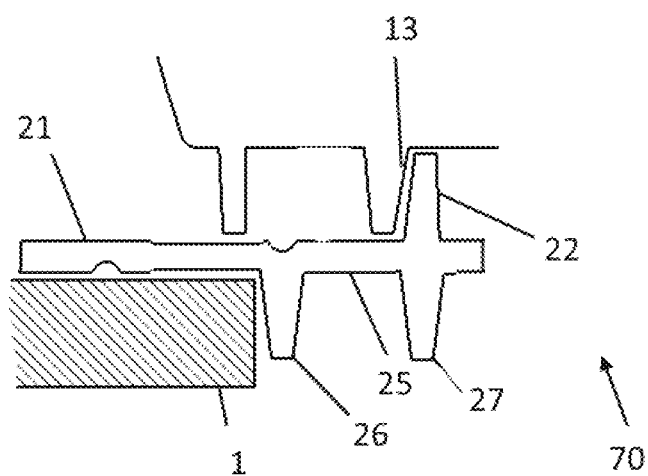

Referring now to FIGS. 7A and 7B, an alternative embodiment is shown illustrating that different configurations are possible within the broadest scope of the invention. In particular, there can be provided matching protection 27 on second side 25 opposite projection 22 on first side 21, enabling projection 13 in the base of the external unit 10 to provide a common location point for both larger and smaller standard opening sizes, thereby providing the first external unit locating element and the second external unit locating element of the claims.

By providing a frame element for installation which can be used for two types of opening using different orientations, the invention simplifies manufacture and installation flexibly suited to two different market standards.

Persons skilled in the art will also appreciate that many variations may be made to the invention without departing from the scopes of the invention, which is determined from the broadest scope and claims.

For example, while the locating elements shown above are all ridges, it will be appreciated that many other geometries are possible within the broadest scope of the invention. For example, incomplete ridges or multiple locating lugs not extending significantly in the third dimension are within the scope, as are recesses or holes in frame 20 shaped to engage with corresponding projections in the base of the external unit 10, and vice versa.

Further, while the example above applies to installation in a roof of a vehicle, the invention extends in its broadest aspects to installation in a wall.

Further also, the openings may be any shape and the claimed "different size" of the second type of opening compared to the first type of opening encompasses any different dimensional size of the opening. For example, in relation to rectangular openings the first and second types include different lengths, different widths or different lengths and widths.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. Further, any method steps recited are not necessarily intended to be performed temporally in the sequence written, or to be performed without pause once started, unless the context requires it Although the invention has been described with reference to specific examples, it will be appreciated by those skilled in the art that the invention may be embodied in many other forms.

It is to be understood that, if any prior art publication is referred to herein, such reference does not constitute an admission that the publication forms a part of the common general knowledge in the art, in Australia or any other country.

The invention claimed is:

1. A frame adapted to be installed in an opening in a roof or wall of a vehicle between an external unit of an air-conditioner and the roof or wall, the opening being either a first opening of a first size or a second opening of a second size, different size from the first size, the frame comprising:

projections on each of a first side and an opposite second side of the frame, the projections being configured together to locate the frame relative to the first opening of the first size and the second opening of the second size and configured to locate the frame relative to the external unit; and the projections on the frame are positioned so that when the opening is the first opening of the first size, the frame is adapted to be installed with the first side facing the roof or wall, and when the opening is the second opening of the second size, the frame is capable of being rotated and installed with the first side facing the external unit.

2. The frame of claim 1 wherein the projections on the first side of the frame comprise a projection adapted to engage with a side of the first opening of the first size, and one of the projections on the second side is adapted to engage with a projection in the external unit, when the first side is facing the roof or wall.

3. The frame of claim 1 wherein the projections on the first side of the frame comprise a first side projection adapted to engage with a side of the first opening of the first size when the first side is facing the roof or wall, and the projections on the second side of the frame comprise a second side projection adapted to engage with a first external unit projection in the external unit, when the first side is facing the roof or wall; and the second side projection is adapted to engage with the side of the second opening of the second size when the first side is facing the external unit, and the first side projection is adapted to engage with a second external unit projection in the external unit when the first side is facing the external unit.

4. The frame of claim 3, wherein one or more of the first side projection, the second side projection, the first external unit projection and the second external unit projection comprise ridges engaging the sides of the first opening or the second opening.

5. The frame of claim 4, wherein the ridges are tapered to facilitate location with the side of the first opening, the second opening, or the external unit.

6. The frame of claim 1 wherein one or more of the projections in the frame is a recess or hole adapted to engage with a projection in the external unit.

7. The frame of claim 1 adapted to receive a duct insert to be installed in the frame in either of two orientations appropriate to installation in the first size or the second size of the opening respectively, the duct insert providing a duct for directing supply air into indoor componentry of the air-conditioner.

\* \* \* \* \*